United States Patent [19]

Hess et al.

[11] Patent Number: 5,471,670
[45] Date of Patent: Nov. 28, 1995

[54] METHOD FOR DETERMINING COMMUNCIATION RESOURCE HANDOFFS

[75] Inventors: Garry C. Hess, Elgin; Barry S. Leung, Palatine; Timothy J. Wilson, Schaumburg, all of Ill.

[73] Assignee: Motorola, Inc., Schaumburg, Ill.

[21] Appl. No.: 85,486

[22] Filed: Jul. 2, 1993

[51] Int. Cl.⁶ .......................... H04B 7/26; H04M 11/00; H04Q 7/38
[52] U.S. Cl. ...................... 455/33.2; 455/56.1; 455/161.3
[58] Field of Search ................... 455/33.1, 33.2, 455/34.1, 54.1, 54.2, 56.1, 67.1, 62, 63, 161.3; 379/58, 60, 59

[56] References Cited

U.S. PATENT DOCUMENTS

| | | | |
|---|---|---|---|
| 4,355,411 | 10/1982 | Reudink et al. | 455/56.1 |
| 4,378,604 | 3/1983 | Wassink | 455/161.3 |
| 4,485,486 | 11/1984 | Webb et al. | 455/56.1 |
| 4,696,027 | 9/1987 | Bonta | 379/60 |
| 4,736,453 | 4/1988 | Schloemer | 455/56.1 |
| 5,067,171 | 11/1991 | Kawano | 455/33.2 |
| 5,093,926 | 3/1992 | Sasuta | 455/34.1 |
| 5,101,501 | 3/1992 | Gilhousen et al. | 455/33.2 |
| 5,128,959 | 7/1992 | Bruckert | 455/33.2 |
| 5,159,593 | 10/1992 | D'Amico et al. | 370/95.3 |
| 5,175,867 | 12/1992 | Wejke et al. | 455/33.2 |
| 5,239,682 | 8/1993 | Strawczynski et al. | 455/33.2 |
| 5,287,544 | 2/1994 | Menich et al. | 455/33.2 |
| 5,327,575 | 7/1994 | Menich et al. | 455/33.2 |
| 5,390,343 | 2/1995 | Rupprecht | 455/161.3 |
| 5,406,588 | 4/1995 | Birchler et al. | 375/346 |

OTHER PUBLICATIONS

TIA Technical Subcommittee, "TR45.3 Digital Cellular Standards", Oct. 26, 1989, Sections 2.4.6–3.4.6.

*Primary Examiner*—Reinhard J. Eisenzopf
*Assistant Examiner*—Mark D. Wisler
*Attorney, Agent, or Firm*—Timothy W. Markison; Daniel C. Crilly

[57] ABSTRACT

In a multiple site communication system, a method for determining when to hand off a communication that is occurring on one communication resource to another communication resource may be accomplished in the following manner. Once a communication unit is allocated a communication resource, it begins to monitor signal usabilities of the allocated communication resource and a predetermined set of alternate communication resources. A broadcast unit associated with the allocated communication resource also monitors the signal usability of the allocated communication resource. When the signal usability of the allocated communication resource is determined to be unfavorable by the communication unit or the broadcast unit, one of the alternate communication resources is selected based on calculated signal usability, such that the communication unit can continue the communication.

9 Claims, 4 Drawing Sheets

METHOD FOR DETERMINING COMMUNCIATION RESOURCE HANDOFFS

FIELD OF THE INVENTION

This invention relates generally to radio communication systems and, in particular, to a radio communication system with geographic reuse of communication resources.

BACKGROUND OF THE INVENTION

Communication systems that geographically reuse communication resources are known. These systems allocate a predetermined set of communication resources in one geographic area and reuse the same set of communication resources in one or more other geographic areas. This reuse technique improves communication capacity by minimizing the number of communication resources necessary to provide communication service in a large geographic area comprised of several smaller geographic areas.

As is also known, a communication resource is defined by the multiplexing scheme utilized in the communication system. For example, with frequency division multiplexing (FDM), the communication resource may be a frequency carrier or pair of frequency carriers; whereas, with time division multiplexing (TDM), the communication resource may be a time slot or pair of time slots in one or more time frames. Further, an assigned code pattern may provide the communication resource in a code division multiplexing (CDM) system.

The most common communication system which geographically reuses communication resources is a cellular system. In a cellular system, allocation of a communication resource begins when a communication unit requests communication service. Based on resource availability and signal usability, a resource controller assigns the communication resource to the communication unit. A communication, such as a conversation or a facsimile transmission, occurs on the communication resource between the communication unit and another communication unit or between the communication unit and a subscriber to a public service telephone network. The communication continues until completion or an interruption in service occurs. In the event of a potential interruption in service, the communication may be reassigned, or handed off, to an alternate communication resource for continuation. The alternate communication resource is generally selected based on the same qualities used by the resource controller to allocate the original communication resource. Upon conclusion of the communication, the resource controller retrieves the communication resource; thus making the communication resource available for another communication.

An important parameter in identifying an acceptable communication resource is signal usability. In a wireless communication system, the communication resources are typically radio frequency (RF) channels that occupy predetermined bandwidths or time slots in predetermined time frames. When information signals are transmitted on the communication resources, undesired effects, such as fading and interference, alter the information signals during transmission. Thus, the information signals received by a receiver in the communication unit, or a broadcast unit, are corrupted by the undesired effects. By ascertaining an indication of the corruption on available communication resources, the least corrupted communication resource may be selected for the communication. This indication of corruption is known as signal usability.

Received signal strength indication (RSSI) and bit error rate (BER) are common methods of estimating signal usability. In an RSSI estimate, the receiver measures a summation of signal levels including the desired information signal, co-channel interference, and noise on the desired RF channel. Although this technique accurately estimates the level of the received signal, it cannot distinguish between the desired information signal and signals due to co-channel interference. Thus, an acceptable RSSI measurement may not indicate acceptable signal usability due to a high level of co-channel interference. Alternatively, BER measurements provide accurate estimates of signal usability, but in geographic areas where error rates are low, multiple measurements and excessive averaging times may be required to obtain the accurate estimates. Thus, measurement periods of ten to fifty seconds may be necessary to obtain accurate BER data.

When the RSSI or BER indicates an unusable communication resource, the communication is handed off from the unusable communication resource to another communication resource. As is known, both the communication unit and the broadcast unit involved in the communication may monitor the usability of the active communication resource and initiate the handoff process upon degradation to it. However, the usability of the active communication resource is not monitored by both units simultaneously. After a handoff is requested, either the broadcast unit, the communication unit, or both determine the alternate communication resource with which to reassign the communication. Generally, the communication unit monitors the active resource's outbound link (from broadcast unit to communication unit) and the broadcast unit monitors its inbound link (from communication unit to broadcast unit). Therefore, when the communication unit requests a handoff, the outbound link has degraded signal usability and when the broadcast unit requests a handoff, the inbound link has degraded signal usability.

Upon initiation of the handoff process, selection of a new communication resource on which to continue the communication is typically approached in two ways. After a handoff is requested due to a degraded inbound link, scanning receivers in broadcast units associated with alternate communication resources measure corresponding inbound link RSSI or BER for the communication. The broadcast units report their measurements to the central controller which selects the communication resource with the best inbound link measurement. This approach ignores the usability of the selected resource's outbound link and utilizes unpreferred methods for determining signal usability. Similarly, after a handoff is requested due to a degraded outbound link, the communication unit obtains RSSI or BER measurements of alternate outbound links and the communication resource with the best outbound link measurement is selected. This approach ignores the usability of the selected resource's inbound link. Further, both approaches do not limit the number of alternate communication resources being considered as handoff candidates, which can be quite large. Thus, additional handoff delays and service interruptions may result.

Therefore, a need exists for a rapid, anticipatory method for determining when to hand off a communication from one communication resource to another based on signal usability of inbound and outbound links.

DESCRIPTION OF A PREFERRED EMBODIMENT

Generally, the present invention provides a rapid, accurate, anticipatory method for handing off a communication from a first communication resource to a second communication resource. This is accomplished by anticipating the potential need to handoff the communication and monitoring the usability of the communication resource in an outbound direction (from broadcast unit to communication unit) and an inbound direction (from communication unit to broadcast unit). When the communication unit is initially assigned to the first communication resource, it receives information to facilitate monitoring of alternate communication resources that are handoff candidates. The communication unit saves this alternate communication resource information and periodically monitors the outbound signal usability of the assigned first communication resource and all alternate communication resources. Similarly, inbound signal usability of the assigned first communication resource is also measured by a broadcast unit associated with the first communication resource. Thus, if either the signal usability of the inbound or outbound direction of the first communication resource becomes unfavorable, the communication is handed off to the second communication resource. The second communication resource is selected based on the alternate communication resource information and interference levels of inbound and outbound directions.

Figure 1:
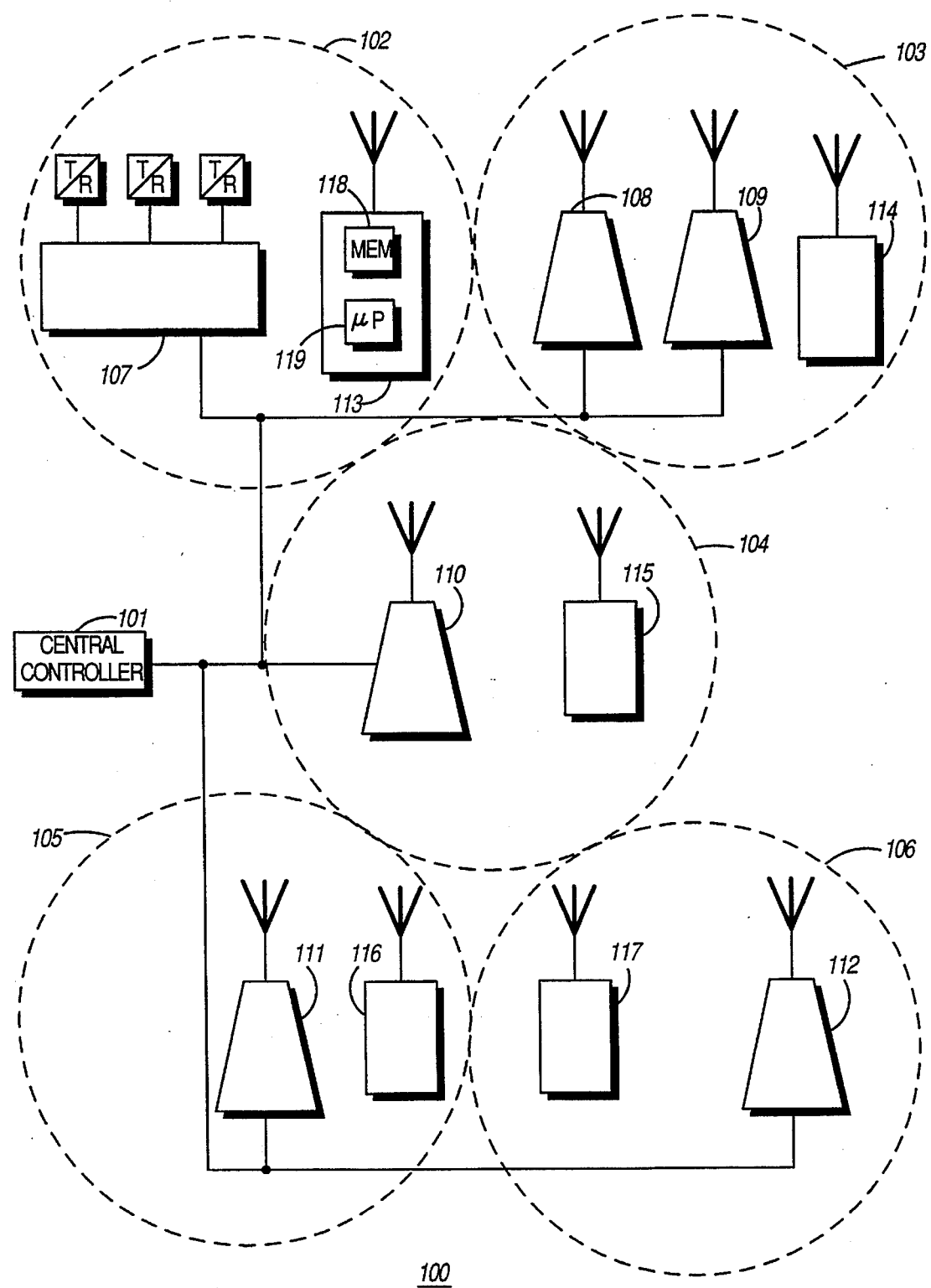
FIG. 1 illustrates a communication system in accordance with the present invention.

The present invention can be more fully described with reference to FIGS. 1-4. FIG. 1 illustrates a multiple site communication system 100 that includes a central controller 101, a plurality of sites 102-106, a plurality of broadcast units 107-112, and a plurality of communication units 113-117. Each of the communication units 113-117 includes memory 118 and a processing unit 119, such as a microprocessor. The plurality of sites 102-106, or cells, are depicted with circular geometries, but they may have almost any geometry and are commonly configured in hexagonal patterns. The plurality of broadcast units 107-112 typically comprises fixed site transceivers, or base stations, and may include multiple transceivers as shown in one broadcast unit 107. The plurality of communication units 113-117 may include mobile two-way radios, portable two-way radios, or any version of mobile or portable radiotelephones. The central controller 101 includes digital switching circuitry and controls the plurality of broadcast units 107-112 by controlling the assignment of communication resources and access to telephone switching networks.

The general operation of the multiple site communication system 100 may be most easily understood by way of an example. A communication unit 113 desiring communication service requests a communication resource from the central controller 101 via a broadcast unit 107. Upon receipt of the request, the central controller 101 assigns the communication unit 113 a communication resource based on communication resource availability and signal usability at the broadcast unit 107. The signal usability at the broadcast unit 107 may be determined using methods described in U.S. Pat. No. 5,406,588, entitled "Method and Apparatus for Mitigating Distortion Effects in the Determination of Signal Usability", issued Apr. 11, 1995 and U.S. patent application Ser. No. 08/069,927, entitled "A Method and Apparatus for Determining Signal Usability" filed May 28 1993, both assigned to Motorola, Inc. The central controller 101 assigns the communication unit 113 a communication resource associated with the broadcast unit 107 having an acceptable signal usability.

Upon allocation of the communication resource and receipt of a list of alternate communication resources that are potential handoff candidates, the communication unit 113 communicates with another communication unit, a central dispatcher, or a subscriber to a public telephone network. In the case where the communication unit 113 communicates with another communication unit or a dispatcher, the associated broadcast unit 107 functions as a repeater; whereas, when the communication unit communicates with a telephone subscriber, the associated broadcast unit 107 receives the communication and forwards it to the central controller 101 which subsequently accesses the telephone network.

During the communication interval, the communication unit 113 typically moves and utilizes its processing unit 119 to monitor the outbound link signal usabilities of the assigned communication resource and all potential handoff candidates. The communication unit 113 stores the signal usability measurements of the handoff candidates in an ordered list in its memory 118 for future use. Additionally, the associated broadcast unit 107 monitors the inbound link signal usability of the assigned communication resource and the other broadcast units 108-112 monitor interference levels of their unassigned communication resources.

The chosen path may result in degradation to the signal usability of the assigned communication resource in either the talkin (communication unit 113 to associated broadcast unit 107) or talkout (associated broadcast unit 107 to communication unit 113) directions, thus necessitating a handoff of the communication from the assigned communication resource to another communication resource. When the signal usability becomes unfavorable as detected by either the communication unit 113 or the associated broadcast unit 107, the associated broadcast unit 107 issues a request to the central controller 101 to reassign, or hand off, the communication to another communication resource. A discussion of unfavorable signal usability is provided below.

The handoff procedure is accomplished in the following manner. The communication unit 113 transmits its list of handoff candidates and their corresponding talkout signal strengths to the associated broadcast unit 107. The associated broadcast unit 107 forwards the list of handoff candidates, their corresponding talkout signal strengths, and a predetermined signal usability threshold to the central controller 101. The central controller 101 transmits the appropriate talkout signal strength and the predetermined signal usability threshold to the broadcast unit associated with the first alternate communication resource on the list. This broadcast unit utilizes reciprocity to determine the projected talkin signal strength from the talkout signal strength received from the central controller 101. Upon obtaining the projected talkin signal strength, this broadcast unit computes an acceptable interference level based on the predetermined signal usability threshold and the projected talkin signal strength and determines whether its interference level is favorable with respect to the acceptable interference level.

When its interference level is favorable, the broadcast unit informs the communication unit 113, via the central controller 101 and the associated broadcast unit 107, to reassign the communication to its alternate communication resource. When its interference level is unfavorable, the broadcast unit informs the central controller 101 of its condition and the central controller 101 transmits the appropriate talkout signal strength and the predetermined signal usability threshold to the broadcast unit associated with the second alternate communication resource on the list. The process repeats until all prospective handoff candidates are examined, the signal usability of the unfavorable assigned communication resource link improves, or the communication is dropped.

In this example, when the communication unit 113 exits its initial site 102 and enters an adjacent site 103, the central controller 101 may reassign the communication to a communication resource associated with either of the two broadcast units 108 and 109 depending on which communication resource provides the most signal usability improvement with respect to the signal usability of the assigned communication resource's unfavorable link without significantly degrading the signal usability of the assigned communication resource's favorable link (that is, the signal usability of the communication resource's favorable link need only remain above a minimum threshold). Upon completion of the communication, the communication unit 113 relinquishes its current communication resource and the broadcast unit associated with the current communication resource notifies the central controller 101 of the disconnection.

Figure 2:
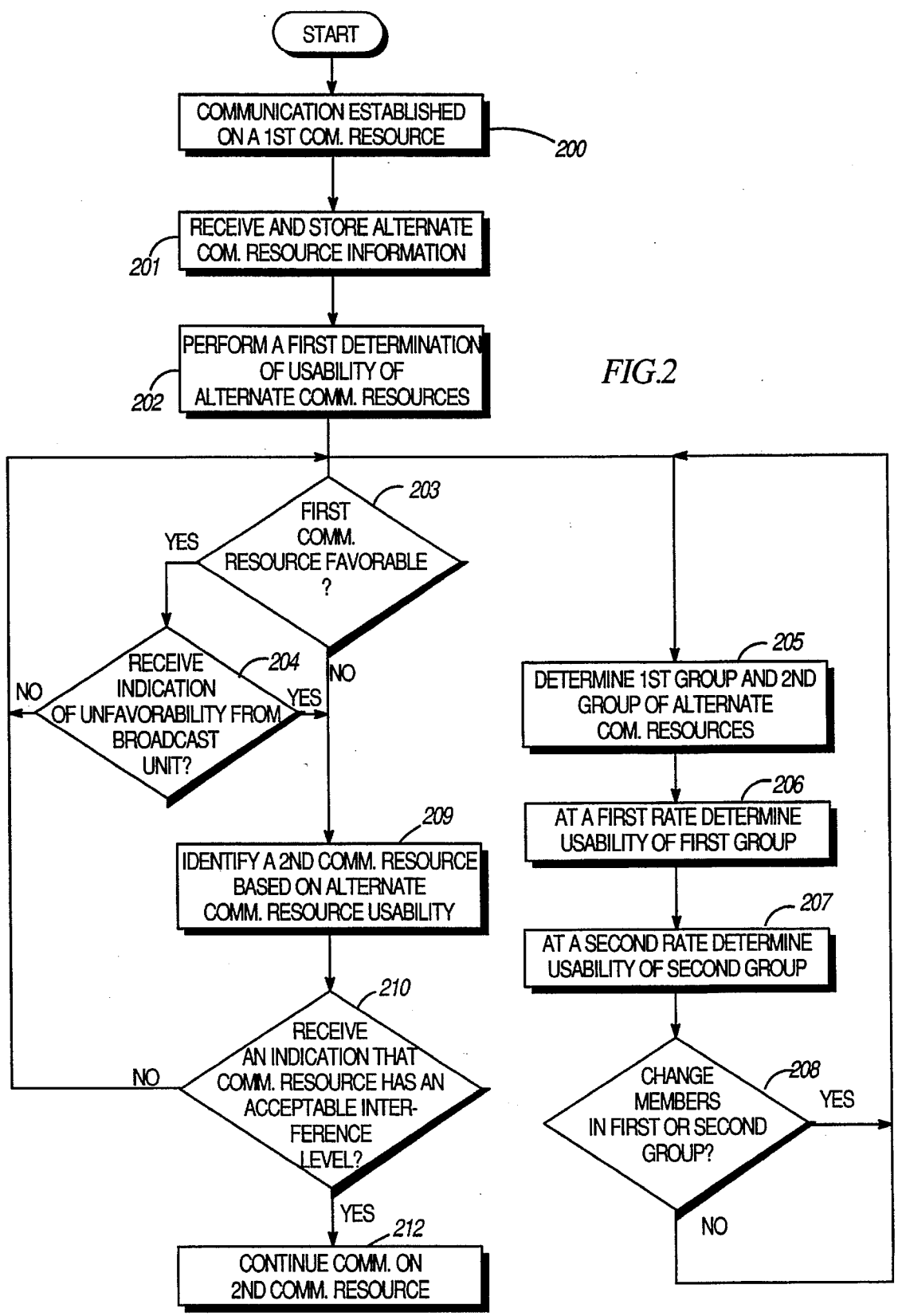
FIG. 2 illustrates a flow diagram of steps executed by a communication unit in accordance with the present invention.

FIG. 2 illustrates a logic flow diagram of steps that a communication unit may execute to implement the present invention. Entering the flow diagram at the START block, logic flow proceeds to block 200 where a communication is established on a first communication resource. The communication unit requests communication service and a central controller assigns the communication to the first communication resource via an associated broadcast unit. The first communication resource provides the transmit and receive paths over which the radio communication occurs. Each path of the first communication resource may be a radio frequency (RF) channel in a frequency division multiple access (FDMA) system or a time slot in a time frame of a time division multiple access (TDMA) system. The logic flow continues to block 201 where the communication unit receives and stores alternate communication resource information. The alternate communication resource information typically includes a list of alternate communication resources. The alternate communication resources are generally located at sites adjacent to that of the first communication resource. However, the alternate communication resources may also be different frequencies or time slots colocated at the same site as the first communication resource. The alternate communication resource information is generated by the central controller and identifies the alternate communication resources that the communication unit monitors.

Next, the logic flow advances to block 202 where the communication unit performs a first determination of the alternate communication resources' signal usabilities. The signal usability of each alternate communication resource is obtained by measuring a signal quality metric of each resource's talkout link. Examples of known signal quality metrics include total received power or received signal strength indication (RSSI), bit or word error rate (applicable to digital communication systems), and carder to interference plus noise ratio (C/(I+N)). The latter is the preferred metric; however, until methods provided in co-pending United States Patent applications, entitled "A Method And Apparatus For Determining Signal Usability" and "A Method And Apparatus For Mitigating Distortion Effects In The Determination Of Signal Usability", assigned to Motorola Inc., having the filing date of May 28, 1993, and referenced by applicant's docket numbers CM01662H and CM00779G respectively, it was not practically realized. With reference to the logarithmic expression of the preferred metric, acceptable signal usability is generally in the 15 dB to 20 dB range depending on communication system configuration.

The alternate communication resource signal usability determinations are most conveniently performed on TDMA systems. In such systems, the communication unit may measure the signal quality metric of the first communication resource's talkout link once every frame. During one or more idle time slots in a frame, the communication unit measures the talkout link signal quality metric for one or more of the alternate communication resources. Thus, in a limited number of TDMA frames, the communication unit completes talkout link signal quality metric measurements for all alternate communication resources. Because signal usability can change rapidly (fifteen second decorrelation times are typical for a land mobile radio environment), the determination of signal usabilities of both the first communication resource and the alternate communication resources should be expeditiously completed and continuously repeated by the communication unit. The communication unit maintains a list of all the alternate communication resources with respect to their signal usabilities. Therefore, should the need for handoff arise, a prioritized list of handoff candidates already exists for the talkout direction.

Continuing down the flow diagram, the logic flow proceeds along two parallel paths to decision block 203 and block 205. At decision block 203, the communication unit determines whether the first communication resource's signal usability is favorable or unfavorable. The term unfavorable pertains to a degradation of the signal quality metric below a predetermined threshold or, more generally, a degradation of the signal quality metric below a predetermined threshold for a predetermined continuous period of time. Alternatively, the term favorable pertains to the condition when the signal quality metric remains at or above the predetermined threshold. For example, the first communication resource's signal usability may be determined to be unfavorable when it momentarily drops below a C/(I+N) value of 20 dB or when it drops below a C/(I+N) value of 17 dB for five seconds. The predetermined threshold may be set at any level, such as a level where the signal is unusable or the signal is acceptable but degraded. Further, the signal usability of the first communication resource may be determined to be unfavorable when the signal usability of an alternate communication resource is farther above the predetermined threshold than is the signal usability of the first communication resource.

When the signal usability of the first communication resource is determined to be favorable by the communication unit, YES branch is taken and the communication unit receives an indication of the first communication resource's unfavorability from the associated broadcast unit 204. The indication is transmitted from the associated broadcast unit to the communication unit and indicates the signal condition of the first communication resource's talkin link. The indication may include talkin link signal usability or a measure as to how far above or below the predetermined threshold the talkin link signal usability is. Otherwise, NO branch is taken to block 209 where the communication unit selects a second communication resource based on the signal usabilities of the alternate communication resources.

At block 205, the communication unit separates the alternate communication resources in its memory into first and second groups. The group separation is performed to minimize the amount of time required to monitor all the alternate communication resources. As the number of alternative communication resources increases, the time required to measure them once will also increase. Therefore, by separating the alternative communication resources into two groups and monitoring the two groups at different rates, the amount of time required to measure the signal usability of each alternate communication resource can be minimized. The first group, or foreground group, comprises the group of alternate communication resources with the most favorable signal usabilities. The second group, or background group, comprises the remaining alternate communication resources.

When the communication unit is initially assigned to the first communication resource, it places all alternate communication resources in the background group. After an initial monitoring cycle, the talkout link signal quality metric values of the alternate communication resources are ranked in order and those having the highest signal usability values are placed in the foreground group. The number of members in the foreground group is typically limited to a maximum number dependant on the maximum monitoring time for each subsequent cycle. The remaining alternate communication resources are placed in the background, or second, group.

After group separation is achieved, the logic flow advances from block 205 to block 206 where the communication unit determines the usability of each alternate communication resource in the first, or foreground, group at a first predetermined rate. In practice, many of the alternate communication resources may be unusable and need not be measured as often as those alternate communication resources that are more prominent handoff candidates. Thus, each subsequent cycle used for monitoring all the alternate communication resources may include measuring the talkout link signal usability of each foreground member and one background member in a predetermined cyclical time sequence. This type of monitoring cycle monitors the more important foreground members at a faster rate than it monitors the less important background members. For example, in a TDMA communication system that utilizes a three slot time frame, the first predetermined rate may include measuring the signal usability of two foreground members in portions of two of the time slots of each frame. Thus, two foreground members are monitored each frame. Next, the logic flow continues to block 207 where the communication unit determines the usability of each alternate communication resource in the second, or background, group at a second predetermined rate. Since the members of the background group are less favorable handoff candidates, the rate at which they are monitored is less than the rate at which the foreground group members are monitored. In the previous example, the second predetermined rate may include measuring one background member in a portion of one time slot in each frame or, equivalently, monitoring one background member per time frame. Therefore, in this example, the first predetermined rate is twice the second predetermined rate.

After measuring the signal usabilities of the alternate communication resources in the second group, the logic flow proceeds to decision block 208 where the communication unit determines whether to change the members in the first and second groups. At pre-established intervals, the status of each group's members signal usability is reevaluated and a regrouping of the members in each group may be performed depending on the result of the status check. For example, when a foreground member's signal usability degrades below that of the highest ranked background member, the highest ranked background member may enter the foreground group and the foreground member exhibiting the less favorable signal usability may enter the background group. The status update may occur every one to five seconds.

When a regrouping of the members in the foreground and background groups is determined to be necessary, the communication unit updates the members of each group and the logic flow continues by taking the YES branch to block 205. Otherwise, the communication unit retains the existing members in each group and the logic flow continues by taking the NO branch to block 205. Therefore, a loop is formed to provide periodic regrouping of foreground and background members during the communication. Thus, the signal usabilities of the first communication resource and all alternate communication resources are periodically monitored such that, in the event a reassignment of the communication is necessary, the best available handoff candidate onto which the communication should be reassigned may be chosen with minimal time delay.

As briefly mentioned above, the NO branch from decision block 203 and the YES branch from decision block 204 may be taken to block 209 where the communication unit identifies a second communication resource based on the signal usabilities of the alternate communication resources. When a handoff is necessary, the communication unit transmits a list of foreground group members, corresponding representations of their outbound link signal strengths, and its effective radiated power (transmit power plus antenna gain) to the central controller via the associated broadcast unit. The list may include all foreground members, some foreground members, or no foreground members depending on whether any members in the foreground group exhibit signal usabilities which will not degrade the talkout link signal usability of the communication when the communication is reassigned to that alternate communication resource. The second communication resource must be one of the alternate communication resources in the list of foreground group members transmitted by the communication unit. Thus, when there are no foreground group members in the communication unit's transmitted list, handoff of the communication is delayed until at least one foreground group member enters the list or the communication is dropped.

After the communication unit transmits its list of usable alternate communication resources to the central controller, the logic flow proceeds to decision block 210 where the communication unit receives an indication whether the second communication resource has an acceptable interference level. Upon receiving the list of alternate communication resources and outbound link signal strength representations from the communication unit, the central controller forwards the identity of the first alternate communication resource in the list, its corresponding outbound link signal strength representation, and a predetermined inbound link signal usability threshold to the broadcast unit associated with the first alternate communication resource. When the first alternate communication resource is available and its interference level provides an inbound link signal usability equivalent to, or better than, the predetermined threshold, the first alternate communication resource becomes the second communication resource and its associated broadcast unit sends an indication of this acceptable condition to the communication unit via the central controller and the broadcast unit associated with the first communication resource. When the first alternate communication resource is unavailable or available with an unacceptable interference level, the broadcast unit associated with the first alternate communication resource notifies the communication unit, via the central controller, of this unacceptable condition and the central controller proceeds to interrogate the next alternate communication resource on its received list. The selection process continues until an acceptable second communication resource is obtained or the entire list of foreground members is exhausted. If no acceptable second communication resource is identified, the selection process continues on updated, or regrouped, lists periodically submitted by the communication unit until an acceptable second communication resource is found, the talkout link signal usability of the first communication resource becomes favorable, the communication drops, or the need for handoff is otherwise retracted.

When the communication unit receives an indication that the second communication resource's interference level is acceptable, the logic flow continues by taking the YES branch to block 212 where the communication unit continues the communication on the selected second communication resource. When the broadcast unit associated with the second communication resource responds to the central controller's inquiry with an acceptable indication, the central controller first informs the broadcast unit associated with the second communication resource to allocate the second communication resource for the handoff and secondly directs the broadcast unit associated with the first communication resource to notify the communication unit of the impending handoff and deassign itself. Upon receiving the handoff notification from the first communication resource's broadcast unit, the communication unit switches from the first communication resource to the second communication resource and continues the communication on the second communication resource with its associated broadcast unit.

When the communication unit receives an indication that the second communication resource's interference level is unacceptable, the logic flow continues by taking the NO branch back to block 203 to form a loop in which the communication unit continues to monitor the favorability of the first communication resource while the handoff is requested, such that, in the event the first communication resource becomes favorable, the handoff request may be cancelled.

Figure 3:
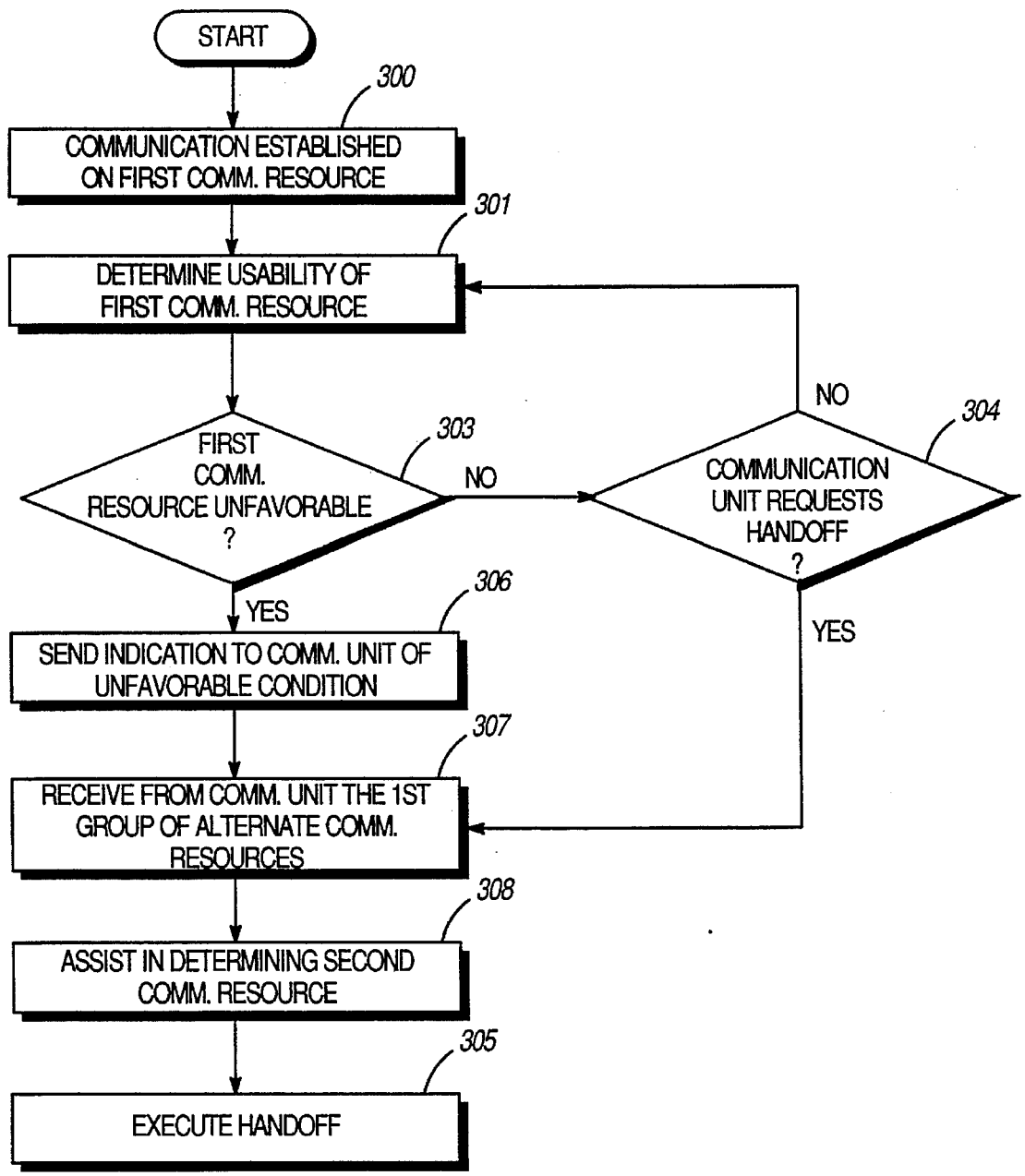
FIG. 3 illustrates a flow diagram of steps executed by a broadcast unit associated with a first communication resource in accordance with the present invention.

FIG. 3 illustrates a logic flow diagram that a broadcast unit associated with the first communication resource may execute to implement the present invention. Entering the flow diagram at the START block, logic flow proceeds to block 300 where a communication is established by a communication unit on the first communication resource supported by the broadcast unit. The establishment of the communication on the first communication resource is substantially identical to the operation performed by block 200 in FIG. 2. The logic flow continues to block 301 where the broadcast unit determines the signal usability of the first communication resource. As similarly discussed with reference to block 202 of FIG. 2, the signal usability is obtained by measuring a signal quality metric of the first communication resource's talkin link. The preferred metric, as previously noted, is the carrier to interference plus noise ratio (C/(I+N)) and is most easily obtained in the TDMA communication system described with reference to block 202 of FIG. 2. However, until methods provided in co-pending United States Patent applications, entitled "A Method And Apparatus For Determining Signal Usability" and "A Method And Apparatus For Mitigating Distortion Effects In The Determination Of Signal Usability", assigned to Motorola Inc., having the filing date of May 28, 1993, and referenced by applicant's docket numbers CM01662H and CM00779G respectively, the preferred metric was not practically realized. In the TDMA system, the rate at which the signal usability of the first communication resource's talkin link is monitored by the broadcast unit is similar to the rate at which the signal usability of the first communication resource's talkout link is monitored by the communication unit. That is, the broadcast unit may measure the signal quality metric of the first communication resource's talkin link once each frame during the time slot when it is actively involved in the communication.

After the signal usability of the first communication resource's talkin link is determined, the logic flow proceeds to decision block 303 where the broadcast unit determines whether the signal usability of the first communication resource's talkin link is unfavorable. The signal usability of the first communication resource's talkin link is determined by measuring a signal quality metric of the talkin link. As similarly discussed with reference to the signal usability determination of the first communication resource's talkout link in decision block 203 of FIG. 2, the signal usability of the talkin link is unfavorable when the measured signal quality metric lies below a predetermined threshold, either momentarily or for a predetermined period of time.

When the signal usability of the first communication resource is determined to be favorable by the broadcast unit, the NO branch is taken to decision block 304 where the broadcast unit determines whether it received a handoff request from the communication unit. When a handoff request is received, the YES branch is taken to block 307 where the broadcast unit receives a list of alternate communication resources from the communication unit's foreground, or first, group. Otherwise, the NO branch is taken back to block 301 such that a loop is formed in which the broadcast unit continuously monitors the usability of the first communication resource's talkin link.

When the signal usability of the first communication resource is determined to be unfavorable by the broadcast unit, the YES branch is taken from decision block 303 to block 306 where the broadcast unit sends the communication unit an indication of the unfavorable condition. The indication, which may be a codeword or set of bits in a symbol stream, notifies the communication unit of the unfavorable signal usability of the talkin link and requests that the communication unit transmit its prioritized list of foreground members to the broadcast unit. As previously discussed with reference to block 205 of FIG. 2, the foreground members are the alternate communication resources in the first of the two groups determined by the communication unit. The foreground members provide the most favorable signal usabilities of all the alternate communication resources.

Next, the logic flow progresses to block 307 where the broadcast unit receives the prioritized list of alternate communication resources in the first, or foreground, group from the communication unit. Since the signal usability of the first communication resource's talkin link is unfavorable, the prioritized list transmitted by the communication unit may not necessarily include all foreground group members; instead, it may only include members that have signal quality metric values equal to or in excess of a predetermined signal quality metric value that is necessary for acceptable communications. For example, when the talkin link signal usability is unfavorable with respect to a C/(I+N) metric value of 20 dB, the list of foreground members sent by the communication unit will only include those members whose C/(I+N) metric values are greater than or equal to 20 dB.

Upon receiving the prioritized list of alternate communication resources from the communication unit, the logic flow proceeds to block 308 where the broadcast unit assists in determining the second communication resource on which to continue the communication. A memory portion of the broadcast unit contains stored knowledge of the predetermined talkin C/(I+N) metric value that produces favorable communication. When the broadcast unit receives the list from the communication unit, it forwards the list and the predetermined talkin metric value to the central controller. The central controller inquires whether the first member of the foreground group is available and whether the broadcast unit associated with that first member has an interference level which allows it to receive the communication unit's talkin power while providing a talkin signal usability equal to or in excess of a predetermined handoff requirement. For talkin initiated handoffs, this requirement need not represent the condition for which signal usability is minimally acceptable. When the broadcast unit receives a positive response, via the central controller, from the broadcast unit associated with the first member of the foreground group, the logic flow continues to block 305 where the broadcast unit directs the communication unit to reassign the communication to the selected alternate communication resource and deassigns itself. The handoff of block 305 is similar to the discussion provided with reference to block 212 of FIG. 2, thus no further discussion will be presented. The communication unit continues the communication on the selected second communication resource with its associated broadcast unit.

Figure 4:
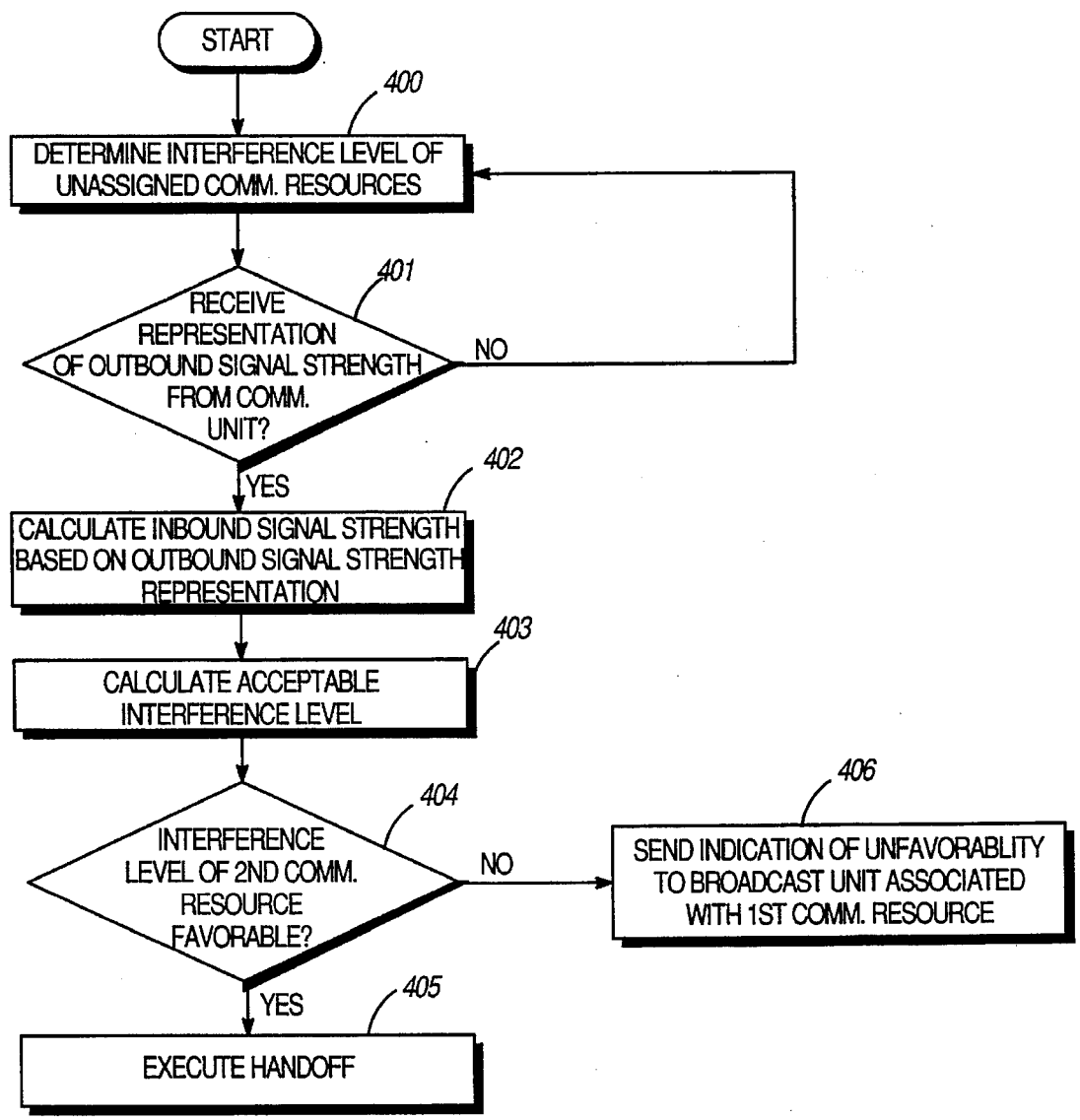
FIG. 4 illustrates a flow diagram of steps executed by a broadcast unit associated with an alternate communication resource in accordance with the present invention.

FIG. 4 illustrates a logic flow diagram that a broadcast unit associated with an alternate communication resource may execute to implement the present invention. Assuming a communication is in progress on a first communication resource involving a communication unit and a broadcast unit associated with the first communication resource, the flow diagram is entered at the START block and logic flow proceeds to block 400 where the broadcast unit associated with the alternate communication resource determines interference levels of all of its unassigned communication resources. This is accomplished by measuring the received talkin signal strengths on these communication resources. The received signals must be due to interference and noise since the communication resources are unassigned, i.e. absent of communications.

Upon determining the interference levels, the logic flow advances to decision block 401 where the broadcast unit associated with the alternate communication resource determines whether it received a representation of outbound, or talkout, signal strength for one of its assigned communication resources from the communication unit, via the central controller. As previously discussed with reference to block 209 of FIG. 2, when a handoff is requested by either the communication unit or the broadcast unit associated with the first communication resource, the communication unit transmits its prioritized list of handoff candidates, corresponding representations of their outbound signal strengths, and its effective radiated power to the broadcast unit associated with the first communication resource. The broadcast unit associated with the first communication resource includes a predetermined inbound, or talkin, signal usability threshold with the information received from the communication unit and forwards the composite information packet to the central controller. When the broadcast unit associated with the alternate communication resource receives a representation of outbound, or talkout, signal strength for one of its assigned communication resources from the central controller, YES branch is taken and the broadcast unit associated with the alternate communication resource calculates a projected, or theoretical, inbound signal strength based on the outbound signal strength representation 402. Otherwise NO branch is taken back to block 400 to facilitate continuous monitoring of the interference levels on the unassigned communication resources.

To compute the projected inbound signal strength, the broadcast unit associated with the alternate communication resource utilizes reciprocity to determine path losses between the communication unit and itself. Upon obtaining path loss, outbound signal strength, and communication unit transmit power, the broadcast unit associated with the alternate communication resource calculates the projected inbound signal strength by simple addition using logarithmic expressions of power. The projected inbound signal strength is the signal strength received by the broadcast unit associated with the alternate communication resource when the communication is handed off to its alternate communication resource.

Upon calculating the projected inbound signal strength, the broadcast unit associated with the alternate communication resource calculates the acceptable interference level 403. The acceptable interference level is the interference level which provides a favorable talkin signal usability for the selected alternate communication resource. The acceptable interference level is computed by subtracting the predetermined inbound signal usability threshold from the projected inbound signal strength. For example, to maintain a favorable inbound signal usability of at least C/(I+N)=20 dB when the projected inbound signal strength is −100 dBm, the acceptable interference level of the selected alternate communication resource (i.e. the I+N term) should remain below −120 dBm.

Upon calculating the acceptable interference level, the logic flow progresses to decision block 404 where the broadcast unit associated with the alternate communication resource determines whether the interference level of its alternate communication resource is favorable. The broadcast unit associated with the alternate communication resource compares the interference level determined in block 400 to the acceptable interference level. For the interference level to be favorable, it must be at or below the acceptable interference level. When the interference level is favorable, the broadcast unit associated with the alternate communication resource notifies the communication unit, via the central controller, of this condition and the alternate communication resource becomes the second communication resource. Upon allocation of the second communication resource, YES branch is taken to block 405 where the central controller directs the communication unit, via the broadcast unit associated with the first communication resource, to reassign the communication to the second communication resource. The handoff of block 405 is similar to the handoff discussion provided with reference to block 212 of FIG. 2, thus no further discussion will be presented.

When the interference level is unfavorable, NO branch is taken to block 406 where the broadcast unit associated with the alternate communication resource sends an indication of its unfavorability to the broadcast unit associated with the first communication resource via the central controller. The broadcast unit associated with the first communication resource subsequently informs the communication unit of this condition and the central controller continues to inquire other alternate communication resources.

The present invention provides a rapid, anticipatory method for determining when to handoff a communication from one communication resource to another. With the present invention, both the talkin and talkout link signal usabilities of the assigned communication resource are continuously monitored using a preferred signal quality metric; thus, handoff of the communication may be initiated when either the talkout link signal usability, the talkin link signal usability, or both become unfavorable with respect to a predetermined value of the signal quality metric. Further, the present invention provides a handoff procedure that selects an alternate communication resource which provides acceptable signal usability via periodic monitoring by the communication unit and broadcast units. Thus, the method of the present invention minimizes handoff delays and service interruptions typically encountered by handoff methods of the prior art. Still further, the present invention limits the number of alternate communication resources being considered as handoff candidates by considering only a portion of the total number of alternate communication resources that are included in a communication unit's foreground group; thus reducing the cycle time needed to monitor the most prospective candidates and minimizing additional handoff delays associated with extensive monitoring cycles of prior art systems.

We claim:

1. In a communication system that includes a plurality of communication units, a plurality of sites, a limited number of communication resources, and a plurality of broadcast units, wherein the plurality of broadcast units are distributed throughout the plurality of sites and transceive the limited number of communication resources, a method for determining when to handoff a communication that is occurring on a first communication resource to a second communication resource, the method comprises the steps of:

a) upon allocation of the first communication resource and receipt of alternate communication resource information generated at the site where the first communication resource reside, storing, by a communication unit involved in the communication, the alternate communication resource information;

b) determining, at a first predetermined rate, by the communication unit, the usability of the first communication resource based on the communication received from an associated broadcast unit that is associated with the first communication resource;

c) determining, at a second predetermined rate, by the associated broadcast unit, the usability of the first communication resource based on the communication received from the communication unit;

d) determining, at a third predetermined rate, by the communication unit, the usability of each alternate communication resource identified in the alternate communication resource information;

e) storing, by the communication unit, an indication of the usability of each alternate communication resource to produce stored alternate communication resource usability information;

f) when either the communication unit or the associated broadcast unit determines that the usability of first communication resource is unfavorable, identifying, by the communication unit together with the associated broadcast unit, the second communication resource based on the second communication resource information and interference levels of inbound and outbound directions of the second communication resource; and g) when the second communication resource has an acceptable interference level, selecting, by the communication unit, the second communication resource and continuing the communication on the second communication resource.

2. In the method of claim 1, step (d) further comprises, after a first determination of the usability of the alternate communication resources, identifying, by the communication unit, a first group of the alternate communication resources and identifying, by the communication unit, a second group of the alternate communication resources, wherein the first group is more favorable than the second group.

3. In the method of claim 2, step (d) further comprises: determining the usability of the alternate communication resources in the fourth group at a first predetermined rate, and determining the usability of the alternate communication resources in the second group at a fifth predetermined rate, wherein the fourth predetermined rate is greater than the fifth predetermined rate.

4. In the method of claim 1, step (f) further comprises determining whether the usability of the first communication resource is unfavorable based on whether the usability of the first communication resource is continuously below a predetermined threshold for a predetermined interval.

5. In a communication system that includes a plurality of communication units, a plurality of sites, a limited number of communication resources, and a plurality of broadcast units, wherein the plurality of broadcast units are distributed throughout the plurality of sites and transceive the limited number of communication resources, a method for determining when to handoff a communication that is occurring on a first communication resource to a second communication resource, the method comprises the steps of:

a) upon allocation of the first communication resource and receipt of alternate communication resource information generated at the site where the first communication resource resides, storing, by a communication unit involved in the communication, the alternate communication resource information:

b) determining, at a first predetermined rate, by the communication unit, the usability of the first communication resource based on the communication received from an associated broadcast unit that is associated with the first communication resource;

c) determining, at a second predetermined rate, by the associated broadcast unit, the usability of the first communication resource based on the communication received from the communication unit;

d) determining, at a third predetermined rate, by the communication unit, the usability of each alternate communication resource identified in the alternate communication resource information;

e) storing, by the communication unit, an indication of the usability of each alternate communication resource to produce stored alternate communication resource usability information;

f) when either the communication unit or the associated broadcast unit determines that the usability of first communication resource is unfavorable, identifying, by the communication unit together with the associated broadcast unit, the second communication resource based on the second communication resource information and interference levels of inbound and outbound directions of the second communication resource; and g) when the second communication resource has an acceptable interference level, selecting, by the communication unit, the second communication resource and continuing the communication on the second communication resource, wherein the detection of the acceptable interference level of step (g) comprises:

g1) determining, by each broadcast unit associated with an alternative communication resource of the alternate communication resources, an interference level of the alternate communication resource when the alternate communication resource is unassigned;

g2) receiving, by a second broadcast unit that is associated with the second communication resource, a representation of outbound signal strength from the communication unit;

g3) calculating, by the second broadcast unit, inbound signal strength based on the representation of outbound signal strength;

g4) calculating, by the second broadcast unit, the acceptable interference level based on the inbound signal strength and a predetermined threshold; and g5) determining, by the second broadcast unit, whether an interference level of the second communication resource is favorable with respect to the acceptable interference level.

6. In a communication unit that is involved in a communication, wherein the communication unit is included within a communication system, wherein the communication system includes a plurality of communication units, a plurality of sites, a limited number of communication resources, and a plurality of broadcast units, and wherein the plurality of broadcast units are distributed throughout the plurality of sites and transceive the limited number of communication resources, a method for at least partially determining when to handoff the communication that is occurring on a first communication resource to a second communication resource, the method comprises the steps of:

a) upon allocation of the first communication resource and receipt of alternate communication resource information generated at the site where the first communication resource resides, storing the alternate communication resource information;

b) determining, at a first predetermined rate, the usability of the first communication resource based on the communication received from an associated broadcast unit that is associated with the first communication resource;

c) receiving, at a second predetermined rate, from the associated broadcast unit, an indication of the usability of the first communication resource to produce first communication resource usability information;

d) determining, at a third predetermined rate, the usability of each alternate communication resource identified in the alternate communication resource information;

e) storing an indication of the usability of each alternate communication resource to produce stored alternate communication resource usability information;

f) when either the usability of the first communication resource or the first communication resource usability information is unfavorable, identifying the second communication resource based on the second communication resource information and interference levels of inbound and outbound directions of the second communication resource; and g) when the second communication resource has an acceptable interference level, selecting the second communication resource and continuing the communication on the second communication resource.

7. In the method of claim 3, step (f) further comprises determining whether the usability of the first communication resource is unfavorable based on whether the usability of the first communication resource is continuously below a predetermined threshold for a predetermined interval.

8. In a communication unit that is involved in a communication, wherein the communication unit is included within a communication system, wherein the communication system includes a plurality of communication units, a plurality of sites, a limited number of communication resources, and a plurality of broadcast units, and wherein the plurality of broadcast units are distributed throughout the plurality of sites and transceive the limited number of communication resources, a method for at least partially determining when to handoff the communication that is occurring on a first communication resource to a second communication resource, the method comprises the steps of;

a) upon allocation of the first communication resource and receipt of alternate communication resource information generated at the site where the first communication resource resides, storing the alternate communication resource information:

b) determining, at a first predetermined rate, the usability of the first communication resource based on the communication received from an associated broadcast unit that is associated with the first communication resource:

c) receiving, at a second predetermined rate, from the associated broadcast unit, an indication of the usability of the first communication resource to produce first communication resource usability information;

d) performing a first determination of the usability of each alternate communication resource identified in the alternate communication resource information, identifying a first group of the alternate communication resources and identifying a second group of the alternate communication resources based on the first determination, wherein the first group is more favorable than the second group, determining the usability of the alternate communication resources in the first group at a third predetermined rate, and determining the usability of the alternate communication resources in the second group at a fourth predetermined rate, wherein the third predetermined rate is greater than the fourth predetermined rate;

e) storing an indication of the usability of each alternate communication resource to produce stored alternate communication resource usability information;

f) when either the usability of the first communication resource or the first communication resource usability information is unfavorable identifying the second communication resource based on the second communication resource information and interference levels of inbound and outbound directions of the second communication resource; and g) when the second communication resource has an acceptable interference level, selecting the second communication resource and continuing the communication on the second communication resource.

9. In a communication system that includes a plurality of communication units, a plurality of sites, a limited number of communication resources, and a plurality of broadcast units, wherein the plurality of broadcast units are distributed throughout the plurality of sites and transceive the limited number of communication resources, a method for a broadcast unit to at least partially determine when to handoff a communication that is occurring on a first communication resource to a second communication resource, the method comprises the steps of:

a) upon allocating the first communication resource, determining usability of the first communication resource based on the communication received from a communication unit;

b) receiving, from the communication unit, an indication of the usability of the first communication resource:

c) when the broadcast unit determines that the usability of the first communication resource is unfavorable or when the indication of the usability of the first communication resource is unfavorable, reassigning the communication to a second communication resource when the second communication resource has an acceptable interference level, wherein the determination of the acceptable interference level of step (c) comprises:

c1) receiving, by a broadcast unit associated with the second communication resource, a representation of outbound signal strength from the communication unit;

c2) calculating, by the broadcast unit associated with the second communication resource, inbound signal strength based on the representation of outbound signal strength;

c3) calculating, by the broadcast unit associated with the second communication resource, the acceptable interference level based on the inbound signal strength and a predetermined threshold;

c4) determining, by the broadcast unit associated with the second communication resource, whether an interference level of the second communication resource is favorable with respect to the acceptable interference level; and c5) when the interference level of the second communication resource is favorable with respect to the acceptable interference level, allocating with the second communication resource to continue the communication.

* * * * *